3,677,962
PROCESS FOR BREAKING PETROLEUM EMULSIONS

Gotz Koerner, Essen, and Gerd Rossmy, Essen-Werden, Germany, assignors to Th. Goldschmidt A.-G., Essen, Germany
No Drawing. Filed July 13, 1970, Ser. No. 54,592
Claims priority, application Germany, July 22, 1969, P 19 37 130.3
Int. Cl. B01d 17/04
U.S. Cl. 252—345                                   20 Claims

ABSTRACT OF THE DISCLOSURE

Process for breaking petroleum emulsions with polyoxyalkylene-polysiloxane-mixed blockcopolymers. The polyoxylalkylene blocks of the polyoxyalkylene-polysiloxane-mixed blockcopolymers have a mole weight of between 500 to 4000 and consist of polyoxyethylene and polyoxypropylene units in a weight ratio of between about 40:60 to 100:0. The polysiloxane blocks contain 3 to 50 silicon atoms per block.

CROSS REFERENCE TO PRIOR ART DISCLOSURE

This invention corresponds to Disclosure Document 000286 deposited in the Patent Office on July 30, 1969.

FIELD OF INVENTION

The invention relates to a procedure for breaking petroleum emulsions.

BACKGROUND INFORMATION AND PRIOR ART

A large portion of petroleum which is obtained from petroleum bearing formations is contaminated by salt water in emulsified form. The amount of salt water is dependent on the circumstances but can be considerable. Such emulsions which predominantly occur as water-in-oil emulsions have to be decomposed into the aqueous and oily phase since otherwise the salt water contained in the emulsion would negatively affect the further processing of the petroleum, particularly during transportation and upon distillation.

The separation of such crude oil emulsions is generally accomplished by settling, heat treatments, centrifuging, by the application of electrical fields or by the addition of emulsion breaking agents.

From a practical point of view the addition of such emulsion breaking agents is of importance only. The crude oil emulsions emanating from the petroleum bearing formations are usually too stable so as to be broken by mere sedimentation, filtering, centrifuging or heating. By contrast, emulsion breaking agents exert a direct influence on the interfaces of the crude oil emulsions and cause a breaking or separation of the emulsion even if applied in relatively low concentrations.

A large number of such emulsion breaking agents have previously been proposed for this purpose. The large number which has been proposed is primarily due to the fact that petroleum has varying composition dependent on the location of drilling and emulsion breaking agents which may be suitable for effectively breaking emulsions of petroleum emanating from one location may be substantially in effective in respect to petroleum emulsions obtained from other locations. In other words, the prior art emulsion breaking agents are substantially petroleum specific.

Alkylsulphates and alkylarylsulphonates as well as petroleum sulphonates in the form of amino salts have been proposed as emulsion breaking agents. Further, addition products of ethylene oxide to suitable compounds with active hydrogen atom as, for example, alkylphenols, castor oil, carboxylic acids, fatty alcohols, alkylphenol and aldehyde resins have found use as emulsion breaking agents. Attention is directed in this context to the book "Oberflaechenaktive Anlagerungsprodukte des Aethylenoxyds" by N. Schoenfeldt, Wissenschaftliche Verlagsgesellschaft m.b.H., Stuttgart, 1959, page 295.

SUMMARY OF THE INVENTION

It is a primary object of the present invention to provide for a procedure for breaking petroleum emulsions which makes use of emulsion breaking agents which can be successfully used for the breaking of petroleum containing emulsions of which the petroleum may emanate from widely differing localities.

Generally it is an object of the invention to improve on the art of breaking petroleum containing emulsions as presently practiced.

Briefly and in accordance with this invention it has surprisingly been found that certain polyoxyalkylene-polysiloxane mixed blockcopolymers known per se exhibit superior emulsion breaking properties in respect to petroleum containing emulsions of the water-in-oil type. It has thus been ascertained that these polyoxyalkylene-polysiloxane mixed blockcopolymers may be successfully used for petroleum containing emulsions irrespective of the source of the petroleum and that the amount of mixed blockpolymers necessary for effectively breaking the emulsions is considerably less than that necessary for the prior art products.

The polyoxyalkylene-polysiloxane mixed blockcopolymers used for the purposes of this invention contain polyoxyalkylene blocks of a molecular weight of between about 500 to 4000, perferably between 1000 to 3000 and consist essentially of polyoxyethylene and polyoxypropylene blocks or units in a weight ratio of between about 40:60 to 100.0. The polysiloxane blocks of the mixed block-copolymers should contain 3 to 50 silicon atoms per block.

If the polyoxyalkylene blocks consist of ethylene oxide and propylene oxide units, then, it is preferred that the ethylene oxide units are present in separate blocks from the propylene oxide units. In such event it is also feasible and encompassed by the scope of this invention to provide polyoxyalkylene blocks wherein several ethylene oxide blocks and propylene oxide blocks are connected in series.

If addition products of ethylene oxide and propylene oxide and water are formed with the former being used in blockwise manner, polyoxyalkylenediols are formed. If a monovalent alcohol is used as starting alcohol, such as, for example, methanol or another lower aliphatic alcohol, polyoxyalkylenemonools are obtained. However, multivalent alcohols, such as, for example, glycerine or sorbite may also be used as starting alcohols and in that event polyoxyalkyleneglycols with 3 or 6 hydroxyl groups are formed.

The polysiloxane blocks which contain 3 to 50 silicon atoms per siloxane block should normally be linear or branched methylpolysiloxanes. However, polysiloxane blocks are also suitable in which the methyl groups are partially replaced by other lower alkyl groups or aryl groups.

The polyoxyalkylene blocks may be linked with the polysiloxane blocks either through SiOC-groups or through SiC-groups. The preparation of such compounds with SiOC-groups is disclosed, for example in German Pat. 1,012,602. The compounds are prepared in a particularly simple manner if one proceeds according to the teaching of U.S. Pat. 3,115,512. Compounds with SiC-linking groups are obtained, for example, by forming addition products of ethylene oxide and propylene oxide to starting alcohols which are olefinically unsaturated and by then reacting these compounds with polysiloxanes containing SiH-groups. Such processes are disclosed, for example, in German Auslegeschrift 1,220,615. Many other processes of this kind belong to the state of the art.

The blockcopolymers to be used in accordance with the invention are liquid to wax-like solids substances which are capable of forming dispersions in water or which dissolve in water. For this reason they can be added directly to the petroleum containing emulsion to be broken or they may be admixed with the emulsion in the form of concentrated solutions or dispersions. Excellent results are also obtained if the blockcopolymers are first dissolved in organic solvents, such as toluene or methanol and the solutions are then added to the emulsions.

Examples for mixed blockcopolymers to be used in accordance with the invention may be represented by the following scheme wherein A indicates a polyoxyalkylene block while B represents a polysiloxane block:

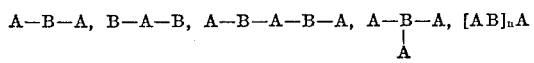

in which $n'$ is any suitable whole number preferably 3 to 50. Polyoxyalkylene blocks with OH or alkoxy groups at the end of the polymer chain serve preferably as terminal groups.

It will be appreciated that this enumeration is not exhaustive but only explanatory. The polyoxyalkylene block A may be represented by the formula:

In this formula $n$ may have a value of from 2.0 to 2.6. The value of $m$ is determined by the requirement that the mole weight of the polyoxyalkylene block should have a value of from 500 to 4000, preferably 1000 to 3000. Z stands for alkyl or aryl of the starting alcohol with which the ethylene oxide and propylene oxide form the addition product. Z may also symbolize alkylene or arylene, provided $r \geq 2$. The index $r$ corresponds to the functionality of the alcohol which serves as starting alcohol. For example, if glycerine is used as starting alcohol, then Z has the structure:

and $r$ has a value of 3. By contrast, if methanol is used as starting alcohol, Z is then $CH_3$ and $r=1$. A polyalkyleneglycol obtained by the addition of alkylene oxide to water causes the formation of a block wherein Z=H. Z is eliminated if A is not in terminal position. $r$ in this instance is also equal to 1.

In the structural scheme shown above, B stands for the polysiloxane block. This polysiloxane block may, for example, have the following structure:

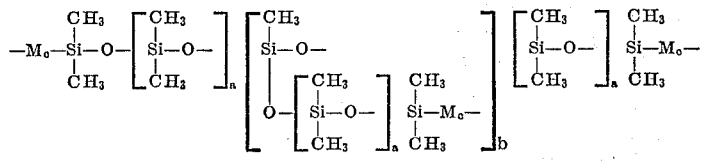

In this formula M stands for alkylene, while $c$ has the value of 0 to 1.

The indices $a$ and $b$ are variable. However, their magnitude is limited by the condition that each polysiloxane block must contain at least 3 but at the most 50 silicon atoms.

A second example for the structure of the polysiloxane block B is indicated by the following formula:

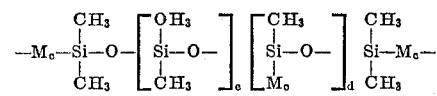

The meaning of the substituent M and of the index $c$ corresponds to the meaning given above. The indices $d$ and $e$ are variable, however, the sum of $d$ and $e$ must have a value of from 1 to 48. From this it follows that $d$ or $e$ may have a value of 0.

A still further example for the structure of the polysiloxane block B is represented by the following formula:

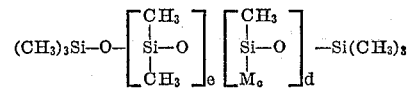

The meaning of the symbols in the formula corresponds to that of the preceding formula, however, $d$ in this formula must at least have a value of 1.

The linking of the blocks A and B may be accomplished through the —SiO-group or a group —SIYO—. Y is a divalent alkylene group or another divalent group, such as, for example,

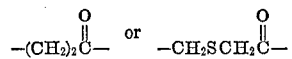

Another group Y which may be used for the inventive purposes, is the group.

wherein R is a divalent hydrocarbon which may be substituted. For example, 2,4-toluylene is suitable for this purpose. The emulsion breaking effect of the mixed blockcopolymers is not substantially affected by the linking group linking the polysiloxane block with the polyoxyalkylene block.

The amount of emulsion breaking agent to be added to the emulsion depends on the circumstances. Generally, 5–150 parts per million (p.p.m.), preferably 10–100 p.p.m., give excellent results.

The invention will now be described by the following example, it being understood that this example is being given by way of illustration and not by way of limitation and that many other mixed blockcopolymers may be used for the inventive purpose.

EXAMPLE

As an emulsion breaking agent of the prior art polyoxyethylene-polyoxypropylene mixed blockcopolymers compounds A and B) as well as a non-ionogenic emulsion breaking agent on polyoxyethylene basis (compound C) were used.

The mixed blockcopolymers used in accordance with the invention had the following average formulas:

I

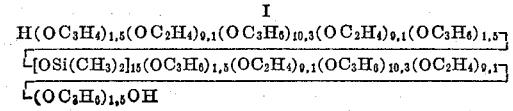

II

H(OC₃H₆)₁.₅(OC₂H₄)₉.₁(OC₃H₆)₁₀.₃(OC₂H₄)₉.₁(OC₃H₆)₁.₅⎤
⎣——[OSi(CH₃)₂]₁₅(OC₃H₆)₁.₅(OC₂H₄)₉.₁(OC₃H₆)₁₀.₃⎦
⎣(OC₂H₄)₉.₁(OC₃H₆)₁.₅—⎦₁₀ OH

III

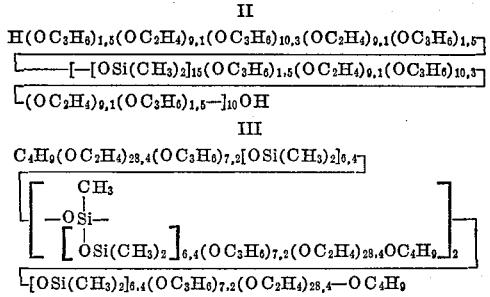

A 2% solution in a 1:1 mixture of toluene and methanol was prepared from each of the emulsion breaking agents. 0.5 ml. of this solution (=100 p.p.m.) were added to 100 ml. of a petroleum emulsion of a temperature of 50° C. The emulsion with the breaking agent added thereto was then shaken 200 times. The test samples were subsequently placed into a drying oven at a temperature of 50° C. The amount of settled water was measured after 1 hour and after 2¾ hours. The petroleum emulsion which was subject to the test was of German origin and of a nature extremely difficult to break. The petroleum had been allowed to stand for a long period of time in the open air which further contributed to the stability of the emulsion.

The results are tabulated in the following table:

PRIOR ART EMULSION BREAKING AGENT

|  | Amount used, p.p.m.[1] | Water separation after 1 hour, ml. | Water separation after 2¾ hours, ml. |
|---|---|---|---|
| Product A | 100 | 0.25 | 4 |
| Product B | 100 | 12 | 31 |
| Product C | 100 | 2.9 | 29 |

MIXED BLOCKCOPOLYMER ACCORDING TO THE INVENTION

|  | Amount used, p.p.m.[1] | Water separation after 1 hour, ml. | Water separation after 2¾ hours, ml. |
|---|---|---|---|
| Product I | 100 | 17 | 37 |
| Product II | 100 | 36 | 37 |
| Product III | 100 | 0.5 | 34 |

[1] Parts by weight per million parts by weight.

The embodiments of the invention in which an exclusive property or privilege is claimed are defined as follows:

1. In a method of breaking a petroleum containing water-in-oil emulsion by the addition to the emulsion of an emulsion breaking agent, the improvement which comprises that the emulsion breaking agent is a polyoxyalkylene-polysiloxane mixed blockcopolymer whose polyoxyalkylene blocks have a molecular weight of between about 500 to 4000 and essentially consist of polyoxyethylene and polyoxypropylene blocks in a weight ratio of between 40:60 to 100:0 and whose polysiloxane blocks contain 3 to 50 silicon atoms per block.

2. The improvement as claimed in claim 1, wherein the mole weight of the polyoxyalkylene blocks is between about 1000 to 3000.

3. The improvement as claimed in claim 1, wherein said polyoxyalkylene blocks are formed from ethylene oxide units and propylene oxide units, the blocks formed from said ethylene oxide units being separate from the blocks formed from said propylene oxide units.

4. The improvement as claimed in claim 1, wherein the polyoxyalkylene blocks are linked to the polysiloxane blocks through SiOC-groups or SiC-groups.

5. The improvement as claimed in claim 1, wherein said mixed blockcopolymers are added to the emulsion in the form of a solution in an organic solvent.

6. The improvement as claimed in claim 1, wherein said blockcopolymers are added to said emulsion in the form of a water dispersion or water solution.

7. The improvement as claimed in claim 1, wherein said mixed blockcopolymers correspond to the formulae:

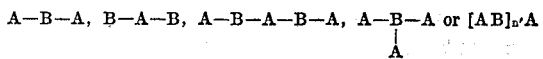

wherein A stands for the polyoxyalkylene block, B stands for the polysiloxane block and $n'$ is a whole number.

8. The improvement as claimed in claim 7, wherein $n'=3$ to 50.

9. The improvement as claimed in claim 8, wherein A corresponds to the formula:

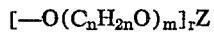

wherein $n=2.0$ to 2.6, $m$ is a number determined by the condition that the mole weight of A is between 500 to 4,000, $r$ is a number corresponding to the functionality of the alcohol or of water with which the alkylene oxide forms the above addition product, and Z is aryl, alkyl, or H, or alkylene or arylene if $r \geq 2$, Z being eliminated if A is not in terminal position and the addition product is formed with water.

10. The improvement as claimed in claim 8, wherein B corresponds to the formula:

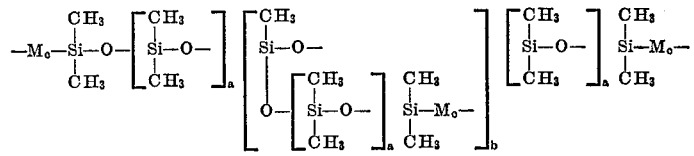

wherein M=alkylene, $c$ is 0 or 1 and $a$ and $b$ are variable but limited by the condition that the total number of silicon atoms in B is between 3 and 50.

11. The improvement as claimed in claim 8, wherein B corresponds to

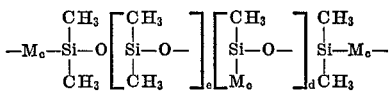

wherein M is alkylene, $c$ is 0 or 1 and $d$ and $e$ are variable, the sum of $d$ and $e$ being between 1 and 48.

12. The improvement as claimed in claim 8, wherein B corresponds to

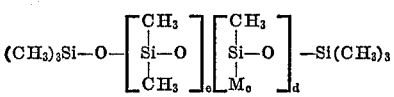

wherein M is alkylene, $c$ is 0 or 1, $d$ is variable, the sum of $d$ and $e$ being between 1 and 48 and $d$ must have the value of at least 1.

13. The improvement as claimed in claim 8, wherein A and B are linked by the group -SiO— or a group —SiYO— wherein Y is a divalent alkylene,

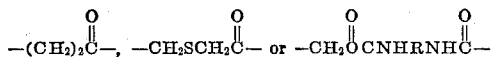

wherein R is divalent hydrocarbon.

14. The improvement as claimed in claim 13, wherein R is 2,4-toluylene.

15. The improvement as claimed in claim 7, wherein the mixed blockcopolymer has the formula:

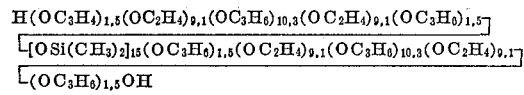

16. The improvement as claimed in claim 7, wherein the mixed blockcopolymer has the formula:

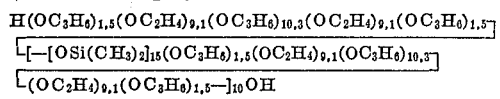

17. The improvement as claimed in claim 7, wherein the mixed copolymer has the formula:

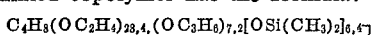

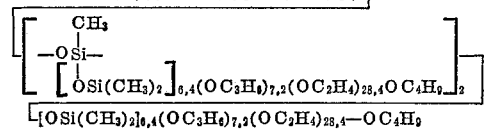

18. The improvement as claimed in claim 1, wherein between about 5–150 p.p.m. of emulsion breaking agent are added to the emulsion.

19. The improvement as claimed in claim 1, wherein said mixed blockcopolymer corresponds to the formula $$[AB]_{n'}A$$

wherein

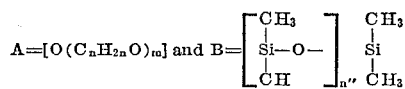

wherein
$n'=3\text{--}50$,
$n=2\text{--}2.5$,
$m$ is a number determined by the condition that the mole weight of A is between 600 and 3000,
$n''$ is a number corresponding to the weight proportion of B,
B amounts to 30–55 percent of the total, the terminal groups of B being —OH, —OR or

wherein R is monovalent hydrocarbon.

20. The improvement as claimed in claim 19, wherein B amounts to 35–45 percent of the total.

References Cited
UNITED STATES PATENTS 3,172,899　5/1965　Bailey _____ 252—358
3,280,160　9/1966　Bailey _____ 252—358

JOHN D. WELSH, Primary Examiner

U.S. Cl. X.R.

252—331, 338